(12) United States Patent
Pan (10) Patent No.: US 7,911,527 B2
(45) Date of Patent: Mar. 22, 2011

(54) FOCUSING APPARATUS AND FOCUSING METHOD (75) Inventor: Yi Pan, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 396 days.

(21) Appl. No.: 12/193,335

(22) Filed: Aug. 18, 2008

(65) Prior Publication Data

US 2009/0051805 A1 Feb. 26, 2009

(30) Foreign Application Priority Data

Aug. 23, 2007 (JP) ................................. 2007-216650

(51) Int. Cl.
*G03B 13/00* (2006.01)
*H04N 5/232* (2006.01)

(52) U.S. Cl. ...................................................... 348/353

(58) Field of Classification Search .................. 348/345, 348/349, 353, 354, 355, 356
See application file for complete search history.

(56) References Cited

U.S. PATENT DOCUMENTS

| 5,264,890 | A  | * | 11/1993 | Komiya | 348/355 |
| 7,228,069 | B2 | * | 6/2007  | Sun    | 348/355 |
| 2006/0203118 | A1 |   | 9/2006  | Hirai  |         |
| 2007/0126917 | A1 | * | 6/2007  | Ohta   | 348/345 |

FOREIGN PATENT DOCUMENTS

| JP | 2000-338387 A | 12/2000 |
| JP | 2004-325517 A | 11/2004 |
| JP | 2006-227605 A | 8/2006  |

* cited by examiner

*Primary Examiner* — Jason Whipkey
(74) *Attorney, Agent, or Firm* — Sughrue Mion, PLLC

(57) ABSTRACT

A focusing apparatus according to an aspect of the present invention comprises: an image pickup device which obtains an image signal of a subject that is captured by an image capturing device, wherein the image capturing device incorporates a focus optical system therein; a search interval calculating device which acquires contrast characteristics that are obtained for a subject of a predetermined spatial frequency at a predetermined focal length and calculates a search interval in capturing of an image based on the contrast characteristics; a focus evaluation value acquiring device which moves a focus lens to a detecting point for each search interval in a predetermined searching range and acquires a focus evaluation value at each detecting point from the image signal; and a focus detecting device which detects a focus position by using the focus evaluation value at each detecting point that is acquired by the focus evaluation value acquiring device.

14 Claims, 8 Drawing Sheets

FOCUSING APPARATUS AND FOCUSING METHOD

BACKGROUND OF THE INVENTION

1. Field of the Invention

The present invention relates to a focusing apparatus and a focusing method, and more specifically to a focusing apparatus and a focusing method which are used in a shoot device (electronic camera) for autofocus control.

2. Description of the Related Art

Each of Japanese Patent Application Laid-Open No. 2006-227605 and Japanese Patent Application Laid-Open No. 2004-325517 discloses a camera that searches for a focus position at a general-searching step and then searches for a focus position again at a specific-searching step if required.

Japanese Patent Application Laid-Open No. 2000-338387 discloses an autofocusing apparatus that performs the second search after the first contrast search if the first contrast search provides an unclear peak. The second search is performed at a focus position that is about the middle of the first contrast search.

SUMMARY OF THE INVENTION

The techniques described in Japanese Patent Application Laid-Open No. 2006-227605, 2004-325517, and 2000-338387 have a problem in that they take a long time in detecting a focus position as they need to search for the focus position twice, for a wide search interval and a narrow search interval, in order to detect the focus position more accurately.

The present invention is adapted in view of the circumstances and intends to provide a focusing apparatus and a focusing method that can detect a focus position in a short time.

In order to solve the abovementioned problem, the focusing apparatus according to a first aspect of the present invention including: an image pickup device which obtains an image signal of a subject that is captured by an image capturing device, wherein the image capturing device incorporates a focus optical system therein; a search interval calculating device which acquires contrast characteristics that are obtained for a subject of a predetermined spatial frequency at a predetermined focal length and calculates a search interval in capturing of an image based on the contrast characteristics; a focus evaluation value acquiring device which moves a focus lens to detecting points in a predetermined searching range with the search interval therebetween and acquires a focus evaluation value at each detecting point from the image signal; and a focus detecting device which detects a focus position by using the focus evaluation value at each detecting point that is acquired by the focus evaluation value acquiring device.

According to the first aspect, a time required for detecting a focus position can be shortened as highly accurate focus detection can be achieved by a single AF search with a search interval that is properly set based on the contrast characteristics and the focal length (zoom position).

A second aspect of the present invention is the focusing apparatus according to the first aspect, wherein the search interval calculating device obtains a maximum value of search intervals, by which a peak position can be detected, from the contrast characteristics, calculates a reference focal depth factor from the maximum value of the search intervals, and calculates a search interval so that a focal depth factor in capturing of an image becomes equal to the reference focal depth factor according to the focal length in the capturing of an image.

A third aspect of the present invention is the focusing apparatus according to the first or second aspect, wherein the predetermined spatial frequency is from 600 TV to 700 TV.

A fourth aspect of the present invention is the focusing apparatus according to the first to third aspects, wherein the contrast characteristics are MTF characteristics or focus evaluation characteristics which are generated with a high frequency component extracted from the image signal of the subject that is captured by the image capturing device.

A fifth aspect of the present invention is the focusing apparatus according to the first to fourth aspects, further comprising: a search interval changing device which calculates a search number of times from the search interval that is calculated by the search interval calculating device and the searching range and, if the search number of times is fewer than a predetermined number of times, makes the search interval in the capturing of an image narrower than the search interval that is calculated by the search interval calculating device, wherein the search number of times indicates a number of times of acquiring the focus evaluation value for each of the detecting points.

According to the fifth aspect, the focus detection can be achieved with the minimum search number of times, as the search number of times is increased when the search number of times is less than a predetermined value.

The focusing apparatus according to a sixth aspect of the present invention comprises: an image pickup device which obtains an image signal of a subject that is captured by an image capturing device, wherein the image capturing device incorporates a focus optical system therein; a search interval calculating device which calculates a search interval, which indicates an interval between detecting points for a focus evaluation value when a focus lens is moved in a predetermined searching range to detect a focus position, calculates a search number of times, which indicates a number of times of acquiring the focus evaluation value, from the searching range and the search interval, and if the search number of times is fewer than a predetermined number of times, makes the search interval in the capturing of an image narrower than the calculated search interval; a focus evaluation value acquiring device which moves the focus lens to the detecting point for each of the search intervals in the searching range and acquires the focus evaluation value at each detecting point from the image signal; and a focus detecting device which detects the focus position by using the focus evaluation value at each detecting point that is acquired by the focus evaluation value acquiring device.

The focusing method according to a seventh aspect of the present invention comprises: an image pickup step for obtaining an image signal of a subject that is captured by an image capturing device, wherein the image capturing device incorporates a focus optical system therein; a search interval calculating step for acquiring contrast characteristics that are obtained for a subject of a predetermined spatial frequency at a predetermined focal length and calculating a search interval in the capturing of an image based on the contrast characteristics; a focus evaluation value acquiring step for moving a focus lens to a detecting point in the search interval and acquiring a focus evaluation value at each detecting point from the image signal; and a focus detecting step for detecting a focus position by using the focus evaluation value at each detecting point that is acquired at the focus evaluation value acquiring step.

An eighth aspect of the present invention is the focusing method according to the seventh aspect, wherein the search interval calculating step includes a step for obtaining the maximum value of search intervals, by which a peak position can be detected, from the contrast characteristics; and a step for calculating a reference focal depth factor from the maximum value of the search intervals and calculating a search interval so that a focal depth factor in capturing of an image becomes equal to the reference focal depth factor according to the focal length in the capturing of an image.

A ninth aspect of the present invention is the focusing method according to the seventh or the eighth aspect, further including: a step for calculating a search number of times from a first search interval that is calculated at the search interval calculating step and the searching range, wherein the search number of times indicates a number of times of acquiring the focus evaluation value for each of the detecting points; and a search interval changing step for making the search interval in the capturing of an image to a second search interval that is narrower than the first search interval if the search number of times is fewer than a predetermined number of times.

The focusing method according to a tenth aspect of the present invention comprises: an image pickup step for obtaining an image signal of a subject that is captured by an image capturing device, wherein the image capturing device incorporates a focus optical system therein; a search interval calculating step for calculating a search interval, which indicates an interval between detecting points for a focus evaluation value when a focus lens is moved in a predetermined searching range to detect a focus position, calculating a search number of times, which indicates a number of times of acquiring the focus evaluation value, from the searching range and the search interval, and if the search number of times is fewer than a predetermined number of times, making the search interval in the capturing of an image narrower than the calculated search interval; a focus evaluation value acquiring step for moving the focus lens to detecting points in the predetermined searching range with the search interval therebetween and acquiring the focus evaluation value at each detecting point from the image signal; and a focus detecting step for detecting the focus position by using the focus evaluation value at each detecting point that is acquired at the focus evaluation value acquiring step.

According to the present invention, a time required for detecting a focus position can be shortened as highly accurate focus detection can be achieved by a single AF search with a search interval that is properly set based on the contrast characteristics and the focal length (zoom position).

DETAILED DESCRIPTION OF THE PREFERRED EMBODIMENTS

Preferred embodiments of the focusing device and the focusing method according to the present invention will be described below with reference to the drawings.

First Embodiment

Figure 1:
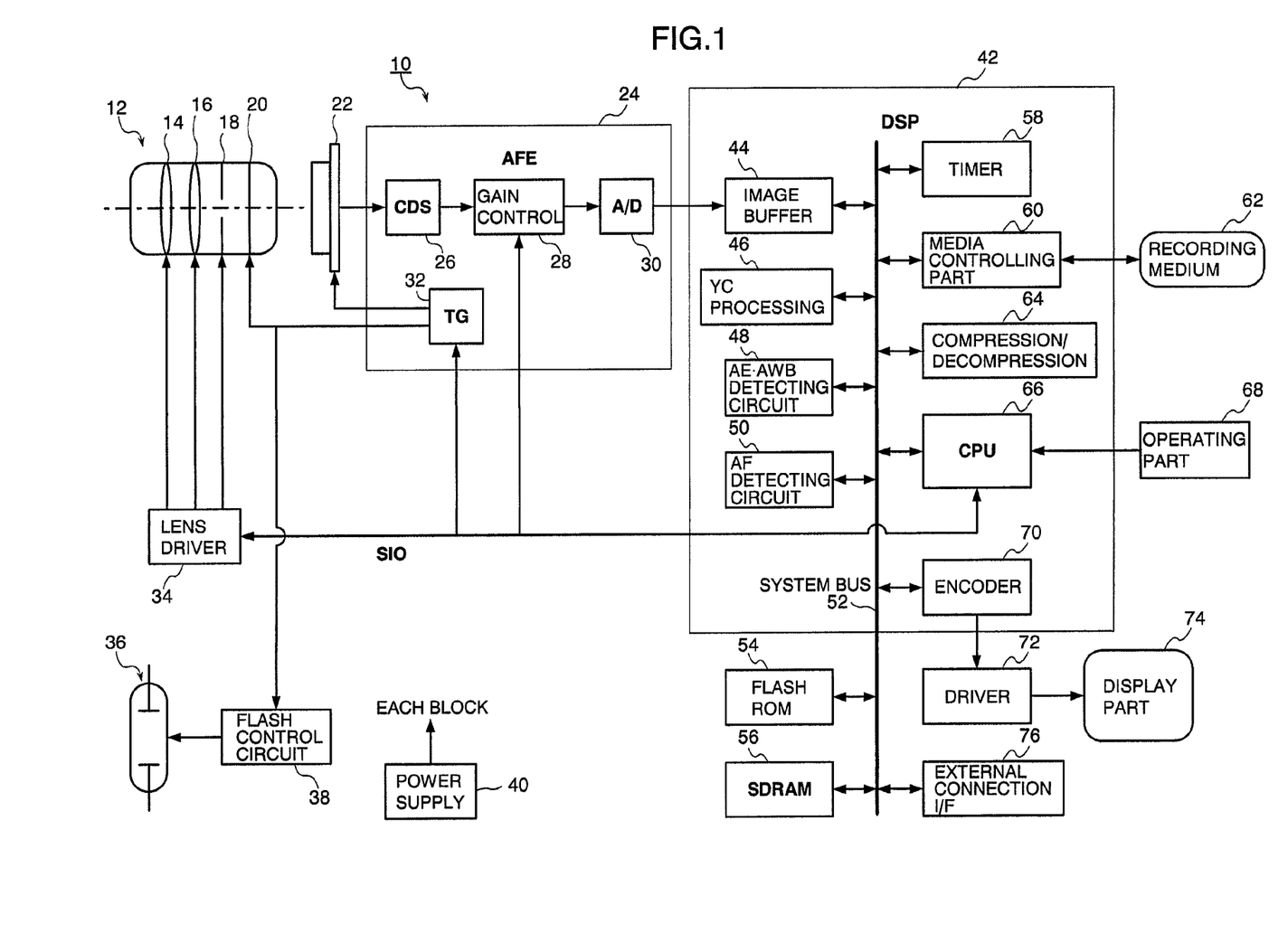
FIG. 1 is a block diagram for illustrating a main configuration of an image capturing device which has a focusing device according to a first embodiment of the present invention.

FIG. 1 is a block diagram for illustrating a main configuration of an image capturing device which has a focusing device according to the first embodiment of the present invention. As shown in FIG. 1, an image capturing device 10 (hereinafter referred to s a camera 10) is an electronic camera which has functions of recording and replaying a picture and a video. A central processing unit (CPU) 66 controls entire operation of the camera 10 according to a predetermined program and also performs various calculations such as an automatic exposure (AE) calculation, an automatic focusing (AF) calculation, and a white balancing (WB) calculation. A power supply circuit 40 supplies a power source to each block of the camera system.

To the CPU 66, a flash ROM 54 and an SDRAM 56 are connected via a system bus 52. The flash ROM 54 stores a program executed by the CPU 66, various types of data which are required for controlling, various constants/information related to operation of the camera, various types of setting information related to operation of the camera 10, and the like. The SDRAM 56 is provided with a region for a program to be decompressed, a region for the CPU 66 to perform calculation, and temporally storage for image data and audio data.

An operating part 68 includes a power switch, a mode selection switch, a capture mode changing switch, a release switch, a menu/OK key, direction keys, and a cancel key. A signal from the operating part 68 is input into the CPU 66. The CPU 66 controls each circuit of the camera 10 for controlling lens driving, image capturing, image processing, recording/relaying of image data, display of a display part 74 based on the signal input from the operating part 68.

The power switch is an operating device for a user to switch ON/OFF of the power supply of the camera 10.

The mode selection switch is an operating device for a user to switch between capture modes and replay modes.

The capture mode changing switch is an operating device for a user to switch the capture modes of the camera 10. The capture modes of the camera 10 are switched among a scene position mode, which is for capturing an image of a subject with the focus and exposure optimized for the scene position (e.g., Natural Photograph, Portrait, Landscape, Sports, Night Landscape, Underwater Photography, Close-up Photograph (such as a flower), or Text Photograph); a face-detecting mode, which is for detecting the face of a subject; an auto-mode, which automatically sets the focus and exposure; a manual mode, in which the focus and exposure can be set manually; and a video mode, for example.

The release switch is an operating device for a user to input an instruction to start capturing. The release switch is a two stroke switch which includes an S1 switch and an S2 switch. The S1 switch is actuated when the release switch is pressed halfway; and the S2 switch is actuated when the release switch is pressed completely down.

The menu/OK key is a function key which has a menu button function for a user to give a command to display a menu on the screen of the display part 74 and an OK button function for a user to give a command to perform confirmation, execution or the like on what is selected.

The direction keys are an operating part for a user to input four directions of UP, DOWN, LEFT, and RIGHT. The direction keys are an operating device (cursor moving device) for a user to select an item on a menu screen or give a command to select an item from various setting items of each menu. Each of the UP key and the DOWN key of the direction keys functions as a zoom switch in the capture modes or a replay zoom switch in the replay modes. Each of the LEFT key and the RIGHT key functions as a frame-by-frame replay button (Forward/Backward) in the replay modes.

The cancel key is used for deleting a desired object such as a selected item, cancelling what is instructed and returning the operation state to a previous one.

A flash button is a button for a user to switch flash modes. When the flash button is pressed in the capture modes, the flash mode is set to a mode in either Fire flash or Never fire.

The display part 74 is a liquid crystal monitor (LCD) which can display color images. The display part 74 can be used as an electronic viewfinder for checking the angle of view in capturing an image as well as a device for replaying a recorded image. The display part 74 is also used as a display screen for a user interface, displaying menu information as well as information such as a selected item and what is set. The display part 74 can be a display device of an electroluminescence or the like other than the liquid crystal monitor.

The camera 10 may be detachably provided with a recording medium 62. The recording medium 62 may be any of various medium such as a semiconductor memory card represented as an xD Picture Card (Registered Trademark) and a Smart Media (Registered Trademark); a portable compact hard disk; a magnetic disk; an optical disk; a magneto-optical disk and the like without limitation. A media controlling part 60 performs signal conversion required for exchanging an input/output signal with the recording medium 62 which is detachably attached to the camera 10.

A timer 58 is a device for clocking, which is used in Self-Timer image-capturing, for example.

The camera 10 has an external connection interface part (external connection I/F) 76 as a communication device for connecting the camera 10 with a personal computer or other external devices. When the camera 10 is connected with an external device via the external connection I/F 76, it can exchange data with the external device. The communication mode between the camera 10 and an external device may be such as the USB, the IEEE 1394 or the Bluetooth (Registered Trademark).

Now, the capture functions of the camera 10 will be described. When a capture mode is selected with the mode selection switch, power is supplied to an image capturing part including an imaging device 22 and the camera 10 becomes available to capture an image.

The imaging device 22 is a color CCD solid state imaging device. The imaging device 22 will be hereinafter referred to as a CCD 22. In the embodiment, the imaging device 22 may be other solid state imaging devices such as the CMOS.

A lens unit 12 is an optical unit including a focus lens 14, a zoom lens 16, an iris 18 and a shutter 20. The CPU 66 focuses by outputting a control signal to a lens driver 34 to drive and move the focus lens 14 (focus position). The CPU 66 zooms by outputting a control signal to a lens driver 34 to drive and move the zoom lens 16 (zoom position). The iris 18 is a so-called turret style iris whose aperture value (F value) changes as a turret deck with apertures from F 2.8 to F 8 turns. The CPU 66 controls the aperture value by outputting a control signal to a lens driver 34. The CPU 66 controls the timing of opening/closing the shutter 20 based on a driving pulse from a timing generator (TG) 32.

The light that passed through the lens unit 12 forms an image on a photosensitive surface of the CCD 22. The photosensitive surface of the CCD 22 has many light receiving elements (for example, photo diodes) arranged thereon in a two dimensional way. Primary color filters of red (R), green (G), and blue (B) are arranged on respective corresponding light receiving elements in a predetermined array. The CCD 22 has an electronic shutter function for controlling a charge storage time (shutter speed) of each light receiving element. The CPU 66 controls the charge storage time in the CCD 22 based on the driving pulse from the TG 32. The CPU 66 controls the electric potential of an OFD (Overflow Drain) in the CCD 22 to adjust the upper limit of signal charge stored in the light receiving elements of the CCD 22.

Each light receiving element converts the subject image formed on the photosensitive surface of the CCD 22 into a signal charge of a quantity according to the quantity of incident light. The signal charges stored in the respective light receiving elements are serially read out as analog voltage signals (R, G, B signals) according to the signal charge based on the driving pulse that is provided from the TG 32 in response to the instruction of the CPU 66.

The analog voltage signal that is read out from the CCD 22 is input into an analog signal processing part (CDS/AMP) 24. The analog voltage signal that is input into the analog signal processing part 24 is subjected to sampling hold processing (correlated double sampling) by a CDS 26 and amplified by a gain control circuit 28, and then subjected to A/D conversion by an A/D converter 30. Amplification gains of the R, G and B signals in the gain control circuit 28 correspond to image capturing sensitivity (ISO). The CPU 66 sets the image capturing sensitivity by adjusting the amplification gains. The R, G and B dot sequential signals which are converted into digital signals by the A/D converter 30 are input into a digital signal processing part 42 as RAW data and stored in the SDRAM 56 via an image buffer 44.

The R, G and B signals stored in the SDRAM 56 are subjected to synchronization (which is the processing of converting a color signal into a simultaneous system by interpolating a spatial gap of the color signal involved in the color filter array of a single chip CCD) and then converted into a luminance signal (Y signal) and color difference signals (Cr, Cb signals) by a YC processing part 46, and also subjected to gradation conversion (for example, gamma correction) and predetermined processing in an outline correction circuit and the like.

When a captured image is to be output on a monitor of the display part 74, the image data is read out from the SDRAM 56 and sent to an encoder 70 via the system bus 52. The encoder 70 converts the input image data into video signals in a predetermined system to be displayed (for example, a color composite picture signal in the NTSC system) and outputs the video signals to the display part 74.

When a live view image (through image) is to be output on a monitor of the display part 74, the image data which represents an image in a frame is rewritten by the image signal which is output from the CCD 22 alternately in a region A and a region B of the SDRAM 56. The written image data is read out from the regions other than the regions, in which the image data is not rewritten. As the image data in the SDRAM 56 is periodically rewritten and the image signal which is generated from the image data is supplied to the display part

74, the image being captured is displayed on the display part 74 in real time. The photographer can check the angle of view by viewing the through image displayed on the display part 74.

When the release switch is pressed halfway (S1 ON), the image signal that is output from the CCD 22 is subjected to the A/D conversion, and then input into an AE•AWB detecting circuit 48 and an AF detecting circuit 50 via the image buffer 44. Then, automatic exposure (AE processing) and automatic focusing (AF processing) start.

The AE•AWB detecting circuit 48 divides a screen into a plurality of divided areas (for example, 8×8 or 16×16), integrates the R, G and B signals for each divided area and provides the integrated values to the CPU 66. The CPU 66 detects the brightness of the subject (subject luminance) based on the integrated values obtained by the AE•AWB detecting circuit 48 and calculates an exposure value appropriate for image capturing (image capturing EV value). The CPU 66 decides the aperture value and the shutter speed according to the obtained exposure value and a predetermined program flowchart. The CPU 66 sets either the flash fire mode or the never flash mode in the case of the auto mode. In this manner, the CPU 66 controls the electronic shutter function, the iris 18 and the flash firing of the CCD 22 so as to have an appropriate exposure quantity. The CPU 66 further decides the exposure value in AF search based on the subject luminance that is detected based on the integrated values obtained by the AE•AWB detecting circuit 48 and decides the shutter speed, the aperture value, the frame rate, and the amplification gain (image capturing sensitivity). Here, the AF exposure is decided based on a spot area photometric value of an AF detecting area, for example. The AF exposure is set little brighter than the exposure in capturing an image, for example.

If the CPU 66 is set to the flash fire mode, it operates a flash control circuit 38 by sending such command thereto. The flash control circuit 38 has a main capacitor that supplies the current for flashing a flash firing part 36 (discharge tube). In response to a flash firing command from the CPU 66, the flash control circuit 38 controls charging of the main capacitor, timing and a time period for discharging (firing) of the flash firing part 36, and the like. The flash firing part 36 may be a Light Emitting Diode (LED) instead of the discharge tube.

The AE•AWE detecting circuit 48 calculates an average integrated value for each of the R, G, and B signals of each divided area in the automatic white balancing, and supplies the calculated result to the CPU 66. As the CPU 66 acquires the integrated value of R, the integrated value of B, and the integrated value of G, it obtains the ratios of R/G and B/G of each divided area, and determines the light source type based on distribution and the like of the R/G and B/G values in a color space on the R/G-B/G coordinates. The CPU 66 corrects the signal in each color channel by controlling a gain value (white balance gain) for each of the R, G, and B signals in the white balancing circuit according to the determined light source type.

For AF control in the camera 10, contrast AF is applied, for example. The contrast AF is for moving the focus lens 14 so as to increase the high frequency component of the G signal of the image signals to the local maximum. Specifically, the AF detecting circuit 50 includes a high-pass filter that passes only the high frequency component of the G signal; an absolutizing part; an AF area extracting part for cutting out a signal in a focus object area which is set on the screen (for example, in the center of the screen) in advance; and an integration part for integrating absolute data in an AF area.

The data on the integrated values obtained by the AF detecting circuit 50 is given to the CPU 66. The CPU 66 acquires RAW data for AF at each AF detecting point by driving and moving the focus lens 14. The AF detecting circuit 50 calculates a focus evaluation value (AF evaluation value) from the RAW data for AF at each AF detecting point, and stores the value in the SDRAM 56. The CPU 66 performs post-moving average evaluation value creation, AF search interruption determination, focus determination and focus calculation by using the AF evaluation value. Specifically, the CPU 66 detects a focus position, at which the AF evaluation value or the post-moving average evaluation value is the local maximum, and decides the position as the focus position. When the CPU 66 can detect the focus position, it moves the focus lens 14 to the obtained focus position. If the CPU 66 cannot detect the focus position, it moves the focus lens 14 to a pan position (pan focus position). The calculation of the AF evaluation value may use the luminance signal (Y signal) without limited to the aspect of using the G signal.

When the release switch is pressed halfway (S1 ON) and the AE processing and the AF processing are performed and then the release switch is pressed completely down (S2 ON), image capturing for recording starts. The image data, which is obtained in response to S2 ON, is converted into luminance/color difference signal (Y/C signal) by the YC processing part 46 and subjected to predetermined processing such as gamma correction, and then stored in the SDRAM 56.

The Y/C signal stored in the SDRAM 56 is compressed into a predetermined format in a compression/decompression circuit 64, and then recorded in the recording medium 62 via the media controlling part 60. For example, a still image is recorded as an image file in the JPEG (Joint Photographic Experts Group) format, and a moving image is recorded as an image file in the AVI (Audio Video Interleaving) format.

When a replay mode is selected with the mode selection switch, compressed data of the last image file recorded in the recording medium 62 (the image file that is recorded last) is read out. If the image file according to the last record is a still image file, the read out image compressed data is decompressed into non-compressed Y/C signals in the compression/decompression circuit 64 and converted into signals for display by an encoder 70, and then output to the display part 74. Accordingly, the image content of the image file is displayed on the screen of the display part 74.

A user can switch image files to be replayed (Forward replay/Backward replay) by operating the Right key or the Left key of the direction keys while a frame of still image is replayed (including while the first frame of a video is replayed). The image file to be replayed next is read out from the recording medium 62 and replayed and displayed on the display part 74.

Figure 2:
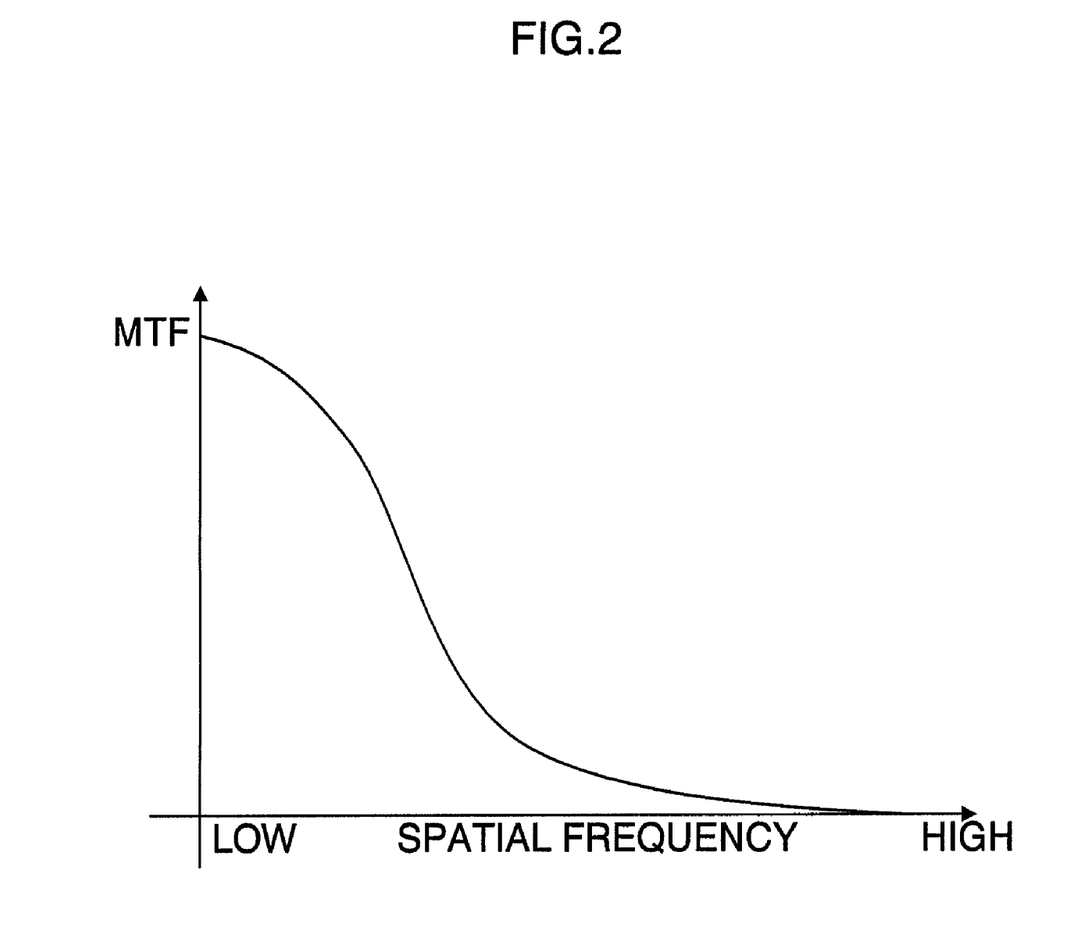
FIG. 2 is a graph for showing MTF characteristics of a camera.

Now, a focusing method according to the present invention will be described. FIG. 2 is a graph for showing MTF (Modulation Transfer Function) characteristics of a camera. The graph of FIG. 2 shows characteristics of contrast sensitivity according to the spatial frequency. The MTF characteristics of a camera mainly depend on performance of the lens and the imaging device (CCD).

Figure 3A:
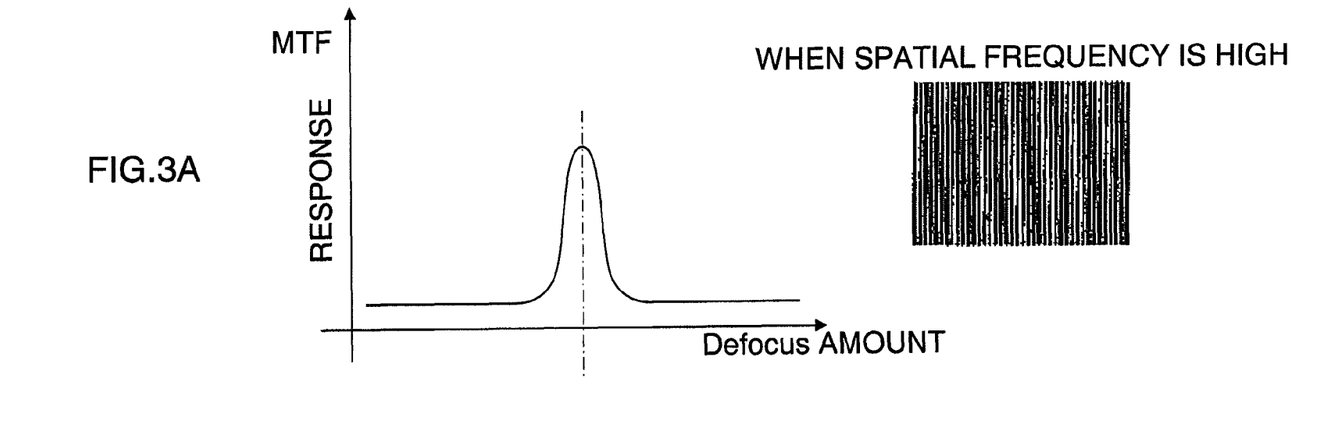
FIGS. 3A and 3B are graphs for showing the MTF characteristics which are acquired by defocusing and capturing subjects with different spatial frequencies.
Figure 3B:
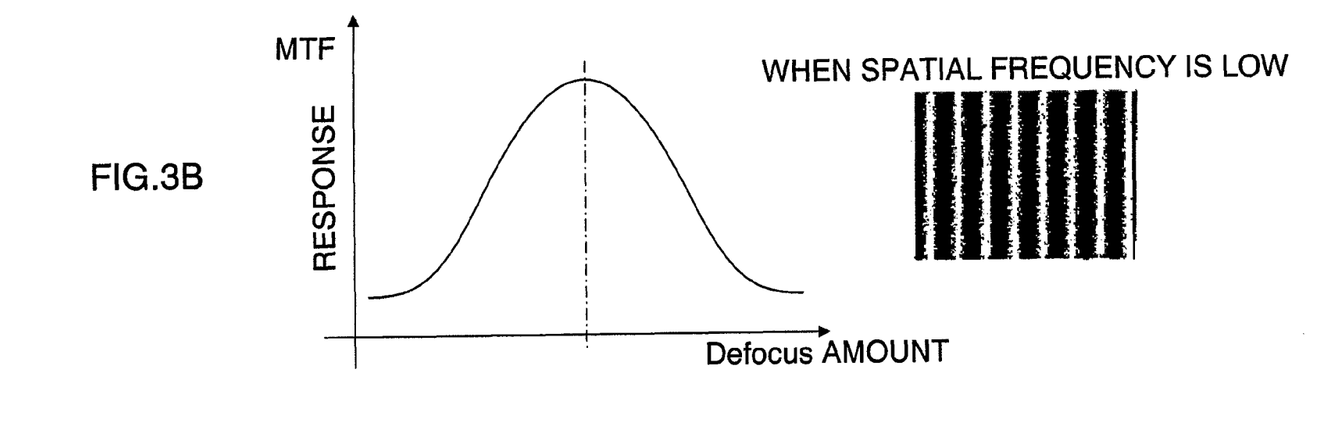

FIGS. 3A and 3B are graphs for showing the MTF characteristics which are acquired by defocusing and capturing subjects with different spatial frequencies. As shown in FIG. 3, as the spatial frequency is higher, the curve width of the MTF characteristics function is narrower.

Figure 4A:
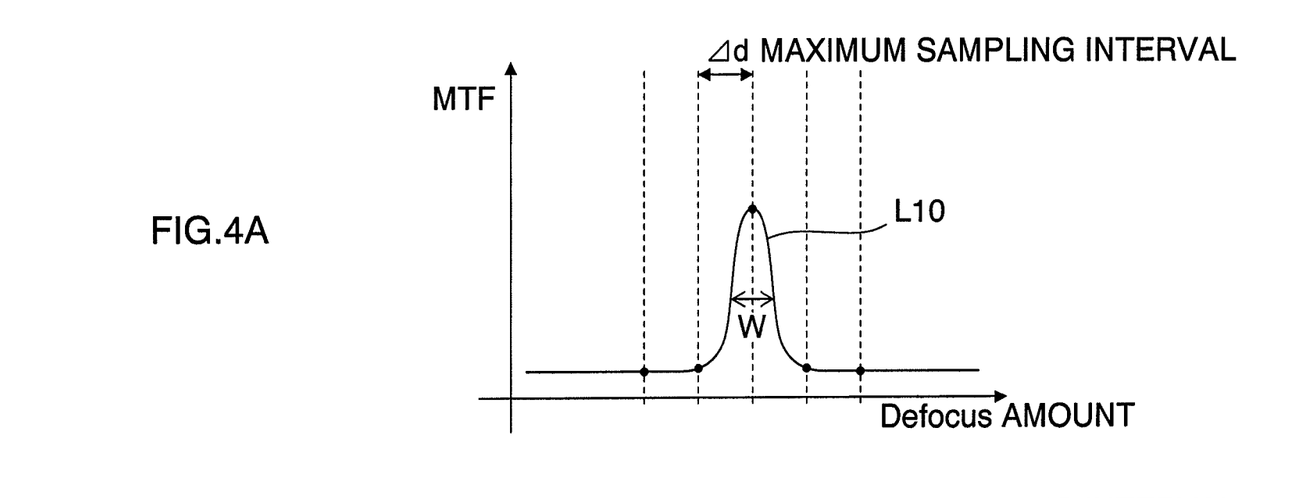
FIGS. 4A and 4B are graphs for schematically showing relationship between the MTF characteristics and sampling intervals.
Figure 4B:
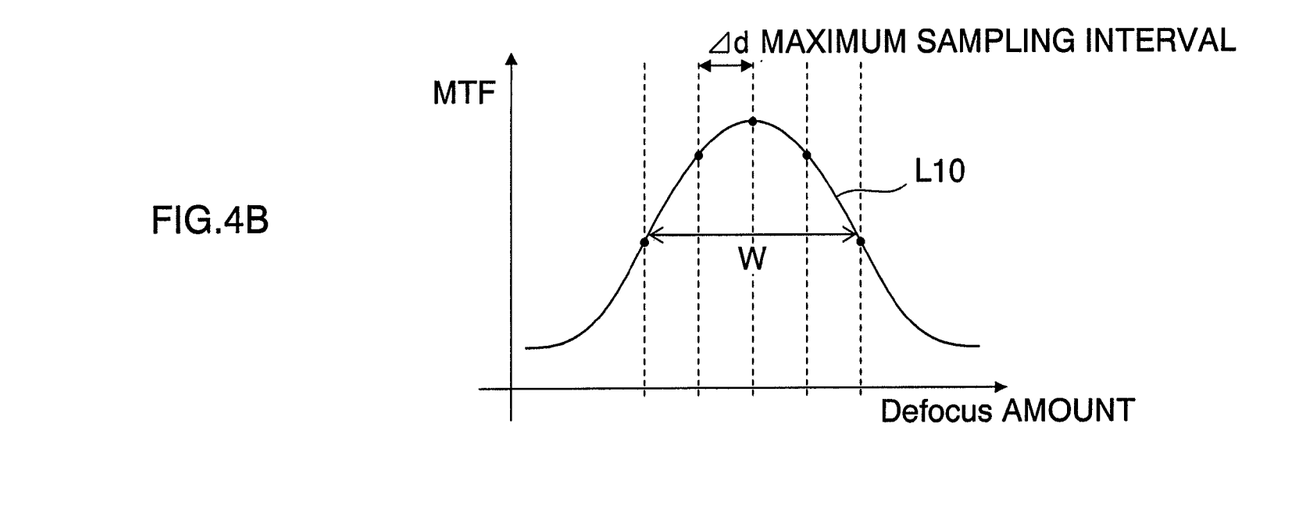

FIGS. 4A and 4B are graphs for schematically showing relationship between the MTF characteristics and sampling intervals. For correct sampling on the MTF characteristics graphs, the maximum value of the sampling interval is assumed to be Δd. In order to correctly calculate the peak position from the MTF characteristics curves L10 in FIG. 4, sampling needs to be performed with the frequency which is double the frequency of the MTF characteristics. Thus, Δd is equal to half of or less than the curve width of the MTF characteristics curve L10 (sampling theorem). If the sampling interval is increased more than Δd, accuracy of the sampling may decrease. A usual captured image is mainly made of components whose spatial frequencies are lower than 600 TV. Therefore, when a usual scene is to be captured, sufficient accuracy of the sampling can be ensured by using the sampling interval Δd, which is obtained from the MTF characteristics in the case of the high spatial frequency, for example, the case where a target spatial frequency is from 600 TV to 700 TV. The sampling interval Δd can be obtained from the MTF characteristics of the image, the contrast characteristics, or the focus evaluation characteristics, which is generated with extracted high frequency component of the image signal of the subject that is captured by the camera 10.

The reference focal depth factor b is defined as the formula (1) below where the sampling interval obtained from the MTF characteristics function is Δd, the aperture value is Fno., and the acceptable blur circle diameter is Phi.

$$B = \Delta d / (2 \times Fno. \times Phi) \quad (1)$$

TABLE 1

| | zoom position | | | | | | | | | |
|---|---|---|---|---|---|---|---|---|---|---|
| | Zp1 | Zp2 | Zp3 | Zp4 | Zp5 | Zp6 | Zp7 | Zp8 | Zp9 | Zp10 |
| Fno. | 2.89 | 3.04 | 3.28 | 3.58 | 3.87 | 4.18 | 4.48 | 4.79 | 5.08 | 5.29 |

Table 1 shows relationship between the zoom position and the aperture value Fno. The focal length and the aperture value vary according to the zoom position. The search interval s in capturing an image is calculated by using the formula (2) below, into which the aperture value Fno. according to the zoom position in the state of S1 ON (during AF search) is substituted.

$$s = b \times (2 \times Fno. \times Phi) \quad (2)$$

Figure 5:
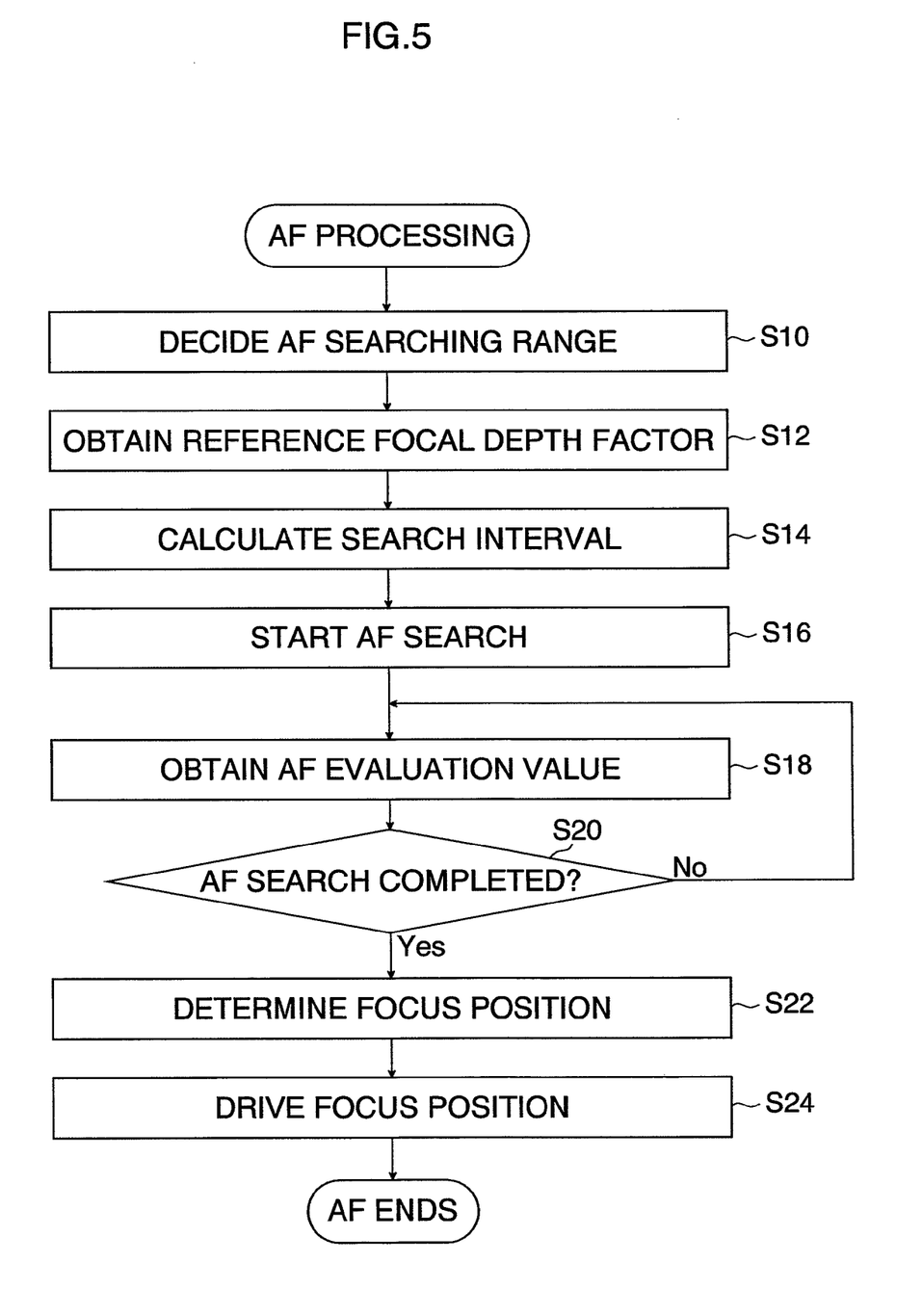
FIG. 5 is a flowchart for showing a flow of AF processing according to the first embodiment of the present invention.

FIG. 5 is a flowchart for showing a flow of AF processing according to the first embodiment of the present invention. When the release switch is pressed halfway (S1 ON), an AF searching range is decided at first (step S10). Here, the AF searching range is decided based on the zoom position and the capture modes (scene position mode, macro mode and the like), for example. The AF searching range is narrowed in the case of the text capturing mode (whiteboard mode) or the macro (close-up) mode, for example.

Next, the reference focal depth factor b is calculated with the formula (1) (step S12). Then, the aperture value Fno. corresponding to the zoom position in the state of S1 ON is obtained from Table 1, and the search interval s is calculated with the formula (2) (step S14).

Next, the AF search starts with the AF searching range that is decided at step S10 and the search interval s that is calculated at the step S14 (step S16). The steps S18 and S20 are repeated and the AF evaluation value is obtained for each search interval s (steps S18, S20) in the range of the AF searching.

Next, the peak position (just-in-focus position) is detected by interpolation (for example, linear interpolation, spline interpolation) performed on the AF evaluation value for each AF detecting point that is obtained at steps S18 and S20 (step S22). Then, the focus lens 14 is driven and moved to the focus position (step S24).

For highly accurate focus detection, the conventional AF processing needs to perform the AF search with a wide search interval and then perform the AF search again with a narrow search interval. That is, the AF search is performed twice in total. That makes a time required in detecting the focus position long. In contrast, according to the above-described embodiment of the present invention, as the search interval is appropriately set, the highly accurate focus detection is realized with a single AF search. That can shorten the time required in detecting the focus position.

Second Embodiment

Now, the second embodiment of the present invention will be described. In the description below, the same components as those of the first embodiment will be omitted.

Figure 6:
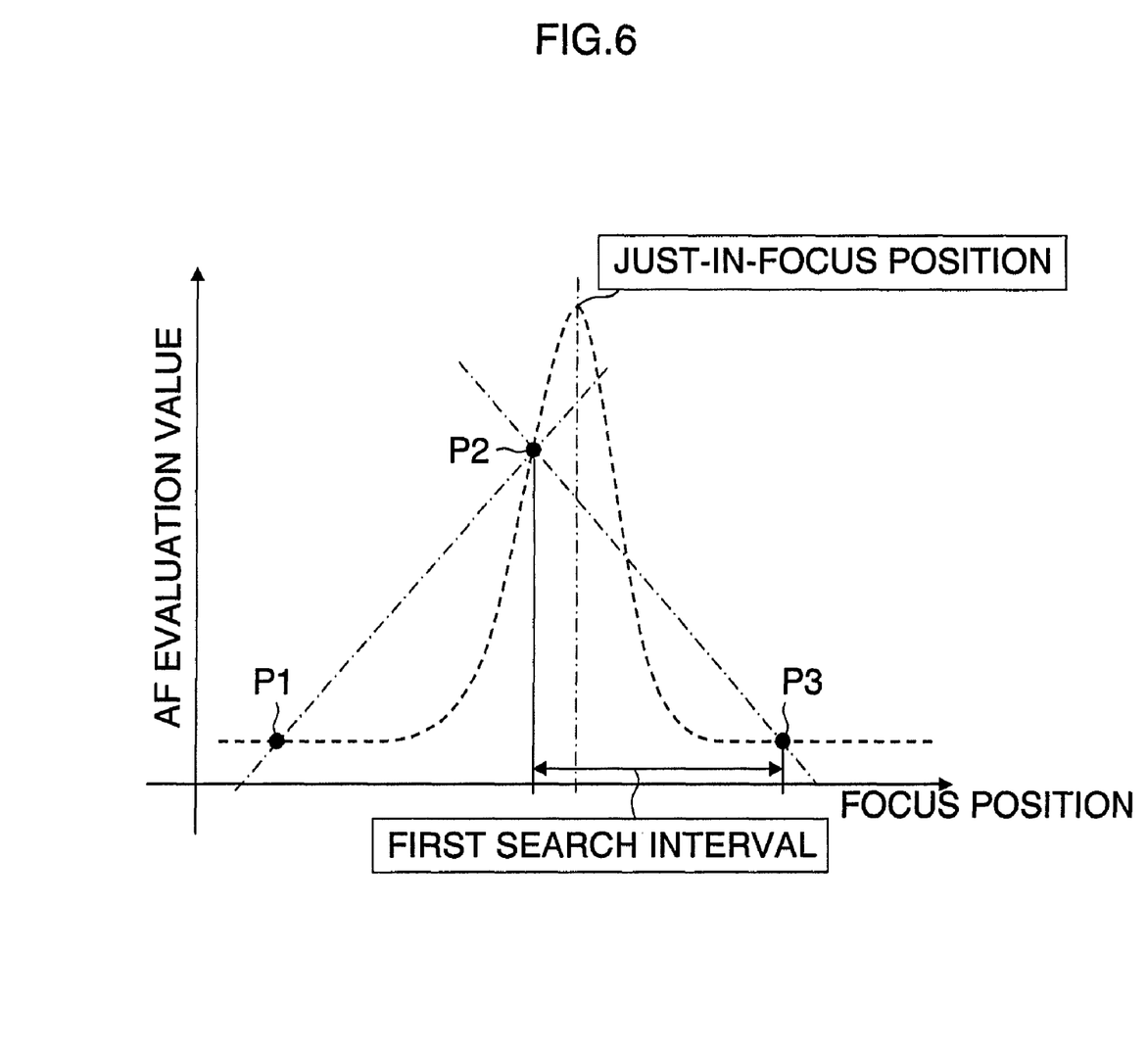
FIG. 6 is a graph for schematically showing AF search.
Figure 7:
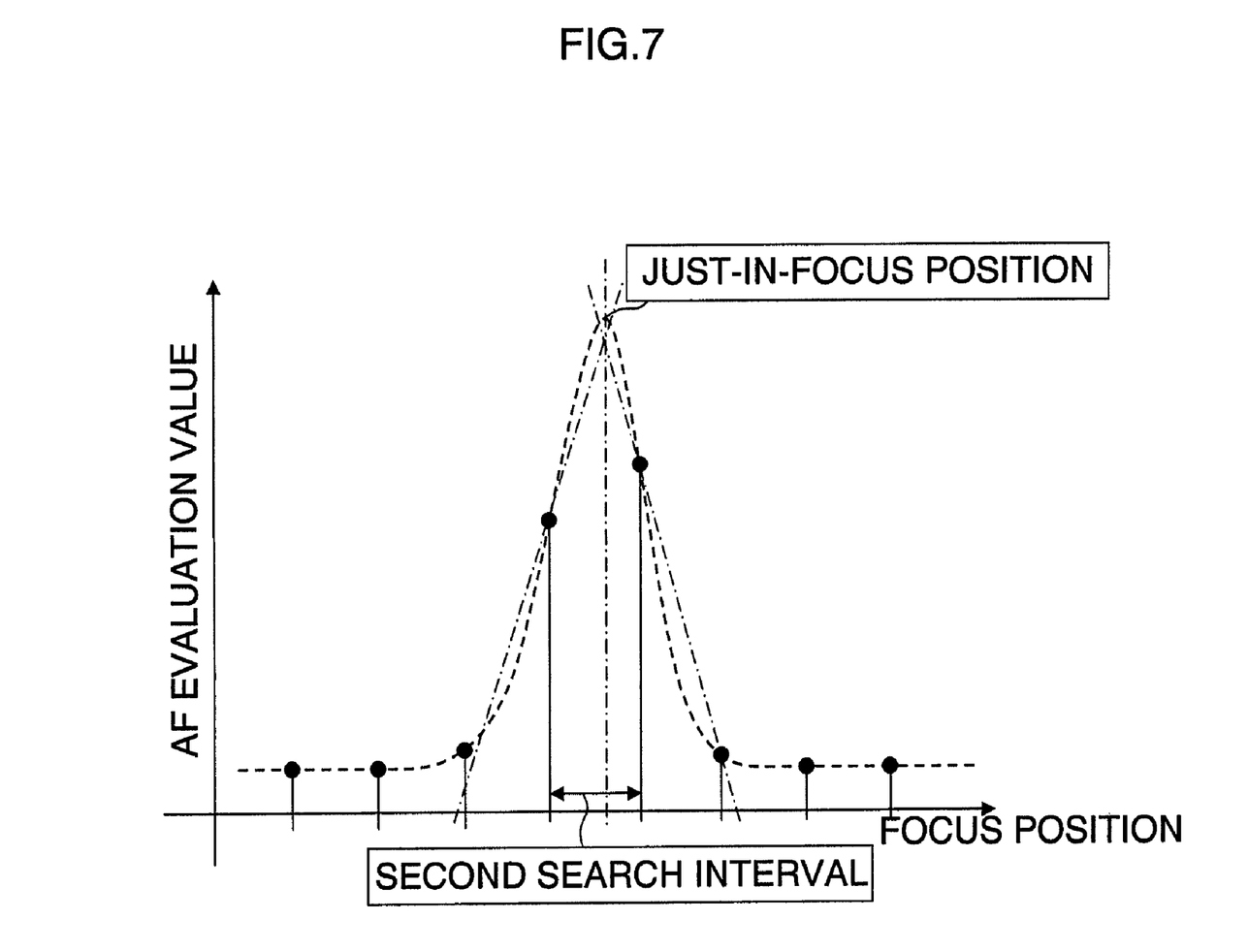
FIG. 7 is a graph for schematically showing AF search.

FIG. 6 and FIG. 7 are graphs for schematically showing the AF search. When the AF search is performed with a preset first search interval, focusing accuracy may be lowered with the small number of the AF detecting points as shown in FIG. 6, even if the entire of the AF searching range is searched and interpolated. Assuming that a predetermined AF searching range is 1000 μm and the first search interval is 400 μm, the AF search ends as it is repeated only twice. As a result, the AF evaluation values can be obtained for three AF detecting points (P1 to P3). That amount of data is insufficient for correctly calculating the focus position (just-in-focus position) even with the interpolation.

In the embodiment, the AF search number of times is calculated from the AF searching range and the search interval. If the obtained AF search number of times is insufficient for detecting the focus position, the search interval is narrowed from the first search interval to a second search interval and the AF search number of times is increased as shown in FIG. 7.

Figure 8:
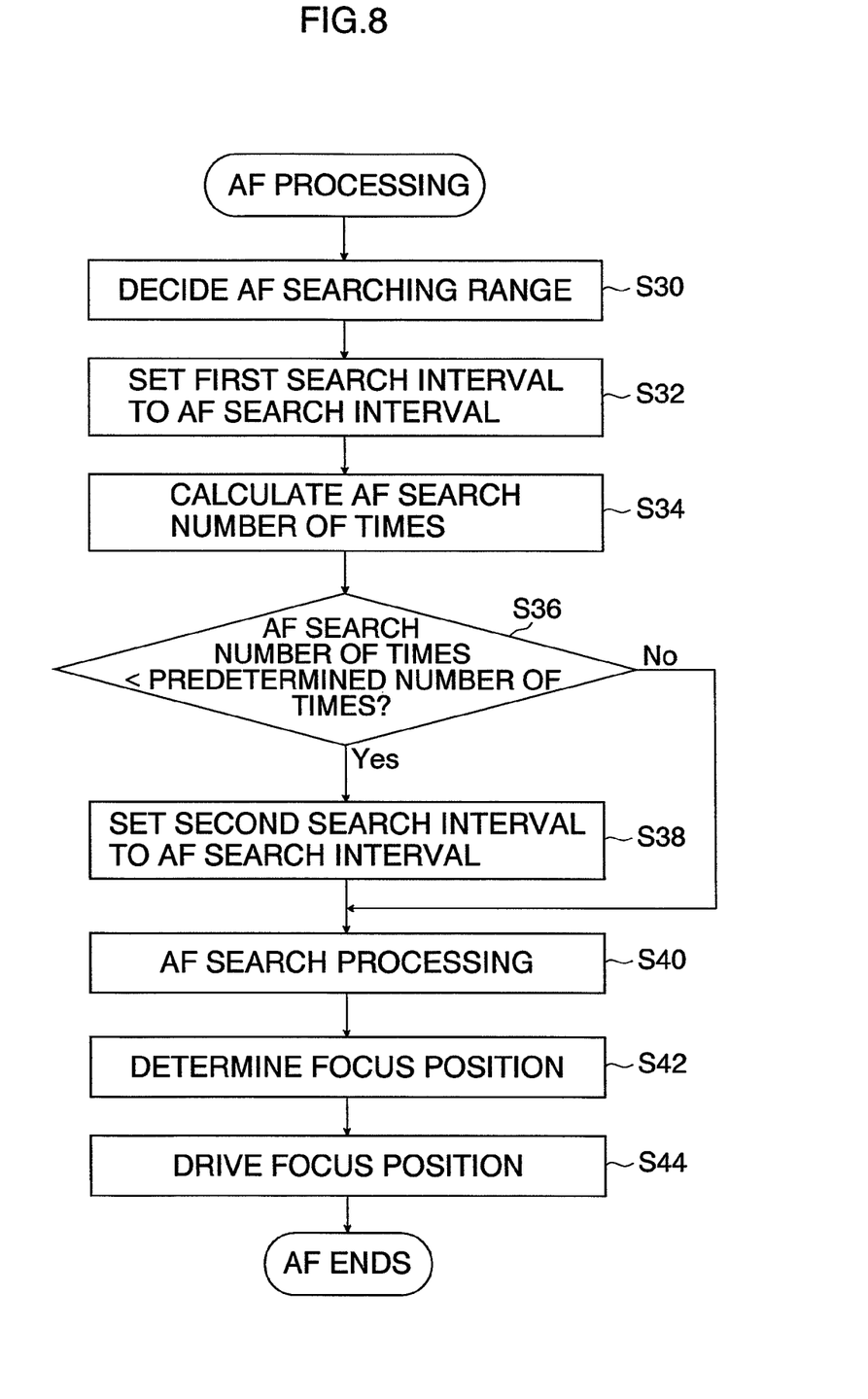
FIG. 8 is a flowchart for showing a flow of AF processing according to a second embodiment of the present invention.

FIG. 8 is a flowchart for showing a flow of the AF processing according to the second embodiment of the present invention. When the release switch is pressed halfway (S1 ON), the searching range is decided at first (step S30), and the first search interval is calculated and set to the search interval for the AF search (step S32). The first search interval is calculated in the same manner as that in the first embodiment, for example. The search interval may be calculated in a manner different from that in the first embodiment.

Next, the AF search number of times is calculated from the AF searching range decided at step S30 and the first search interval calculated at the step S32 (step S34). When the AF search number of times is fewer than a predetermined number of times (for example, 3 or 4) (Yes at step S36), the second search interval, which is narrower than the first search interval, is set to the search interval (step S38). When the AF search number of times is higher than the predetermined number of times (No at step S36), the search interval is left as the first search interval.

Next, the AF evaluation value for each AF detecting point in the AF searching range is obtained (step S40), and the focus position (just-in-focus position) is determined (step S42). Then, the focus lens 14 is driven and moved to the focus position (step S44).

According to the embodiment, the AF search number of times is calculated from the searching range and the search interval in advance, and the AF search number of times, which is sufficient for keeping the focusing accuracy, is ensured. That can prevent the search interval from being excessive, which lowers the focusing accuracy and the focus speed.

What is claimed is:

1. A focusing apparatus comprising:
   an image pickup device which obtains an image signal of a subject that is captured by an image capturing device, wherein the image capturing device incorporates a focus optical system therein;
   a search interval calculating device which acquires contrast characteristics that are obtained for a subject of a predetermined spatial frequency at a predetermined focal length and calculates a search interval in capturing of an image based on the contrast characteristics;
   a focus evaluation value acquiring device which moves a focus lens to detecting points in a predetermined searching range with the search interval therebetween and acquires a focus evaluation value at each detecting point from the image signal; and
   a focus detecting device which detects a focus position by using the focus evaluation value at each detecting point that is acquired by the focus evaluation value acquiring device.

2. The focusing apparatus according to claim 1, wherein the search interval calculating device obtains a maximum value of search intervals, by which a peak position can be detected, from the contrast characteristics, calculates a reference focal depth factor from the maximum value of the search intervals, and calculates a search interval so that a focal depth factor in capturing of an image becomes equal to the reference focal depth factor according to the focal length in the capturing of an image.

3. The focusing apparatus according to claim 2, wherein the predetermined spatial frequency is from 600 TV to 700 TV.

4. The focusing apparatus according to claim 3, wherein the contrast characteristics are MTF characteristics or focus evaluation characteristics which are generated with a high frequency component extracted from the image signal of the subject that is captured by the image capturing device.

5. The focusing apparatus according to claim 4, further comprising:
   a search interval changing device which calculates a search number of times from the search interval that is calculated by the search interval calculating device and the searching range and, if the search number of times is fewer than a predetermined number of times, makes the search interval in the capturing of an image narrower than the search interval that is calculated by the search interval calculating device, wherein the search number of times indicates a number of times of acquiring the focus evaluation value for each of the detecting points.

6. The focusing apparatus according to claim 1, wherein the predetermined spatial frequency is from 600 TV to 700 TV.

7. The focusing apparatus according to claim 1, wherein the contrast characteristics are MTF characteristics or focus evaluation characteristics which are generated with a high frequency component extracted from the image signal of the subject that is captured by the image capturing device.

8. The focusing apparatus according to claim 1, further comprising:
   a search interval changing device which calculates a search number of times from the search interval that is calculated by the search interval calculating device and the searching range and, if the search number of times is fewer than a predetermined number of times, makes the search interval in the capturing of an image narrower than the search interval that is calculated by the search interval calculating device, wherein the search number of times indicates a number of times of acquiring the focus evaluation value for each of the detecting points.

9. A focusing apparatus comprising:
   an image pickup device which obtains an image signal of a subject that is captured by an image capturing device, wherein the image capturing device incorporates a focus optical system therein;
   a search interval calculating device which calculates a search interval, which indicates an interval between detecting points for a focus evaluation value when a focus lens is moved in a predetermined searching range to detect a focus position, calculates a search number of times, which indicates a number of times of acquiring the focus evaluation value, from the searching range and the search interval, and if the search number of times is fewer than a predetermined number of times, makes the search interval in the capturing of an image narrower than the calculated search interval;
   a focus evaluation value acquiring device which moves the focus lens to the detecting point for each of the search intervals in the searching range and acquires the focus evaluation value at each detecting point from the image signal; and
   a focus detecting device which detects the focus position by using the focus evaluation value at each detecting point that is acquired by the focus evaluation value acquiring device.

10. A focusing method comprising:
    an image pickup step for obtaining an image signal of a subject that is captured by an image capturing device, wherein the image capturing device incorporates a focus optical system therein;
    a search interval calculating step for acquiring contrast characteristics that are obtained for a subject of a predetermined spatial frequency at a predetermined focal length and calculating a search interval in the capturing of an image based on the contrast characteristics;
    a focus evaluation value acquiring step for moving a focus lens to a detecting point in the search interval and acquiring a focus evaluation value at each detecting point from the image signal; and
    a focus detecting step for detecting a focus position by using the focus evaluation value at each detecting point that is acquired at the focus evaluation value acquiring step.

11. The focusing method according to claim 10, wherein the search interval calculating step comprises
    a step for obtaining a maximum value of search intervals, by which a peak position can be detected, from the contrast characteristics; and
    a step for calculating a reference focal depth factor from the maximum value of the search intervals and calculating a search interval so that a focal depth factor in capturing of an image becomes equal to the reference focal depth factor according to the focal length in the capturing of an image.

12. The focusing method according to claim 11, further comprising:
a step for calculating a search number of times from a first search interval that is calculated at the search interval calculating step and a searching range wherein the search number of times indicates a number of times of acquiring the focus evaluation value for each of the detecting points; and
a search interval changing step for making the search interval in the capturing of an image to a second search interval that is narrower than the first search interval, if the search number of times is fewer than a predetermined number of times.

13. The focusing method according to claim 10, further comprising:
a step for calculating a search number of times from a first search interval that is calculated at the search interval calculating step and a searching range wherein the search number of times indicates a number of times of acquiring the focus evaluation value for each of the detecting points; and
a search interval changing step for making the search interval in the capturing of an image to a second search interval that is narrower than the first search interval, if the search number of times is fewer than a predetermined number of times.

14. A focusing method comprising:
an image pickup step for obtaining an image signal of a subject that is captured by an image capturing device, wherein the image capturing device incorporates a focus optical system therein;
a search interval calculating step for calculating a search interval, which indicates an interval between detecting points for a focus evaluation value when a focus lens is moved in a predetermined searching range to detect a focus position, calculating a search number of times, which indicates a number of times of acquiring the focus evaluation value, from the searching range and the search interval, and if the search number of times is fewer than a predetermined number of times, making the search interval in the capturing of an image narrower than the calculated search interval;
a focus evaluation value acquiring step for moving the focus lens to detecting points in the predetermined searching range with the search interval therebetween and acquiring the focus evaluation value at each detecting point from the image signal; and
a focus detecting step for detecting the focus position by using the focus evaluation value at each detecting point that is acquired at the focus evaluation value acquiring step.

* * * * *